(12) United States Patent
Huengerle et al.

(10) Patent No.: US 7,055,328 B2
(45) Date of Patent: Jun. 6, 2006

(54) METHOD AND DEVICE FOR REGULATING THE POWER OUTPUT OF A COMBINED-CYCLE POWER STATION

(75) Inventors: Manfred Huengerle, Bruehl (DE); Bernhard Meerbeck, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/717,537

(22) Filed: Nov. 21, 2003

(65) Prior Publication Data
US 2004/0129002 A1    Jul. 8, 2004

(30) Foreign Application Priority Data
Nov. 21, 2002    (EP) .................................. 02026036

(51) Int. Cl.
*F01K 13/02*    (2006.01)
(52) U.S. Cl. .............................. 60/660; 60/663; 60/685
(58) Field of Classification Search ............... 60/641.2, 60/641.8, 653, 679, 698, 660, 663, 685
See application file for complete search history.

(56) References Cited

U.S. PATENT DOCUMENTS

| | | | |
|---|---|---|---|
| 4,005,581 A | * | 2/1977 | Aanstad ....................... 60/660 |
| 4,571,151 A | * | 2/1986 | Paul ............................... 415/1 |
| 2003/0213246 A1 | * | 11/2003 | Coll et al. ..................... 60/653 |

FOREIGN PATENT DOCUMENTS

| | | |
|---|---|---|
| DE | 3336596 | 4/1985 |
| DE | 3841224 | 6/1990 |
| DE | 19517053 | 11/1996 |
| DE | 19602330 | 6/1997 |
| DE | 19621247 | 11/1997 |
| DE | 19859364 | 7/2000 |
| DE | 10003914 | 10/2000 |
| EP | 0286377 | 10/1988 |
| EP | 0297718 | 1/1989 |
| EP | 0663575 | 1/1994 |

* cited by examiner

*Primary Examiner*—Hoang Nguyen

(57) ABSTRACT

For regulating the power output of a combined-cycle power station, that power output fraction which is allocated to the uncoupling of distance heat is determined as a second desired value by adopting the mass flow or mass flows of a medium to be heated through one or more heating condensers and the forward-flow and return-flow temperatures of the medium to be heated which occur at the same time. The quantities can be determined in a simple way in the region of the uncoupling of the distance heat. Thus, complicated measurements in the region of a steam turbine, by which the heating condensers are supplied with heating steam, are avoided.

17 Claims, 2 Drawing Sheets

METHOD AND DEVICE FOR REGULATING THE POWER OUTPUT OF A COMBINED-CYCLE POWER STATION

The present application hereby claims priority under 35 U.S.C. §119 on European patent application number EP 02026036.0 filed Nov. 21, 2002, the entire contents of which are hereby incorporated herein by reference.

FIELD OF THE INVENTION

The invention generally relates to a method and a device for regulating a combined-cycle power station.

BACKGROUND OF THE INVENTION

In many known power stations, an existing device for steam generation and also a steam turbine are also utilized, in, addition to the generation of electrical energy, for generating what may be referred to as distance heat, where partially expanded steam, which still possesses sufficient energy for heating a medium to be heated, is extracted from the steam turbine and supplied as heating medium to one or more heating condensers on the primary side. The medium to be heated, for example water, flows through such heating condensers on the secondary side and is heated by way of the heating medium and supplied to heat consumers.

It is thereby possible to use the energy generation of a power station for the generation both of electrical energy and of distance heat, for example for heating purposes, in which case, as a rule, a high overall efficiency can be achieved.

It must be remembered, in this context, that, as a result of the uncoupling of distance heat, some of the heat energy of the process steam is no longer available for the generation of electrical energy. If, then, the power station is to make available a required quantity of electrical power which is predetermined, for example in the form of a load schedule, by a higher management center, then the regulation of the steam generation of the power station must take into account not only the electrical power requirement, but also that power output fraction which is needed for generating the distance heat and which, as already mentioned, is not available for the generation of electrical energy.

Thus, for example, a regulating device of a steam generator of the power station is acted upon by a higher desired power output value than would be necessary solely for the generation of electrical energy.

That power output fraction which is allocated to the uncoupling of distance heat is designated as what would be called reduced electrical power output which is to be added to the (required) electrical power output of the power station and is to be supplied as a corresponding desired power output value to a power output controller of the power station.

Known methods and devices for determining the above-mentioned reduced electrical power output usually make use of empirically determined relations, for example the pressure with which the turbine blades of a high-pressure stage of the steam turbine are acted upon being adopted. Other influences, such as, for example, a varying, in particular higher cooling water temperature or shutdowns of preheaters, may in this case often not be taken into account.

In summary, it can be established that, to determine the reduced electrical power output, operating parameters relating to the steam turbine are adopted to a great extent in the prior art, so that, in particular, a method found for a specific power station for determining the reduced electrical power output cannot readily be transferred to another power station. This is because the corresponding operating parameters of the respective steam turbines depend very closely on the respective type of steam turbine. Therefore relations determined empirically for one steam turbine cannot readily be transferred to another steam turbine.

SUMMARY OF THE INVENTION

An object on of an embodiment of the invention is to specify an improved method and device for regulating the power output of a combined-cycle power station. By this, in particular, the reduced electrical power output can be determined and taken into account in a simple way.

The method according to an embodiment of the invention and the device are to be applicable to a multiplicity of power stations without particular difficulties.

An advantage of the method according to an embodiment of the invention and also of the device is to be seen in that, to determine the second desired power output value (=reduced electrical power output), only measurements in the region of the distance heat are necessary and no turbine-specific influencing parameters and quantities have to be determined and taken into consideration.

Thus, to determine the second desired value, only the mass flow or mass flows of the medium to be heated through the heating condenser or heating condensers and the forward-flow and return-flow temperature of the medium to be heated have to be determined with respect to each heating condenser, for example by measurements. Since the quantities are recorded in any case in many combined-cycle power stations and processed in an existing management system, in very many cases there is no need for any additional outlay in order to determine said quantities.

So that the calculation of the reduced electrical power output can be carried out in a particularly simple way, the following simplifying assumptions are preferably made:

The effects of the uncoupling of the distance heat on temperatures and pressures in the turbine or turbines may be ignored.

The load dependence of the enthalpy profile of the turbine or turbines may be ignored.

The effects on the calculation result by secondary condensates which occur may be ignored.

The second desired value (reduced electrical power output) can then be determined by way of the following formulae:

$$\Delta P_G = \dot{m}_{ent}(h_{ent} - h_{cond}) \cdot \epsilon_T;$$

where:

$$\dot{m}_{ent} = \frac{\dot{m}_{heat}(\vartheta_{VL} - \vartheta_{RL})}{\frac{h_{ent}}{c_W} - \vartheta_{VL}}.$$

With:

$\dot{m}_{ent}$: heating steam mass flow
$\dot{m}_{heat}$: mass flow of the medium to be heated
$\Theta_{VL}$: forward-flow temperature (outlet temperature) of the medium to be heated
$\Theta_{RL}$: return-flow temperature (inlet temperature) of the medium to be heated
$h_{ent}$: heating steam enthalpy $$\left[\frac{kJ}{kg}\right]$$

$h_{cond}$: condensate enthalpy $$\left[\frac{kJ}{kg}\right]$$

$c_W$: specific heat capacity of the medium to be heated $$\left[\frac{kJ}{kg \cdot K}\right]$$

$\epsilon_T$: turbine utilization degree
$\Delta P_G$: second desired value (reduced electrical power output)

According to a fundamental idea of the proposed method, the heating steam mass flow is calculated with the aid of quantities in the region of the uncoupling of the distance heat, instead of turbine-side measurements having to be carried out.

According to the above formulae, the heating steam mass flow is derived essentially from the mass flows of the medium to be heated through the heating condensers, and also from the forward-flow and return-flow temperatures occurring at the same time.

The also occurring quantities of heating steam enthalpy, of condensate enthalpy, of the specific heat capacity of the medium to be heated and of turbine efficiency are preferably assumed to be constant, since their values are essentially determined by the design of the plant and less by current operating conditions.

If there is a plurality of heating condensers in a plant, the above formulae must be evaluated for each heating condenser and the corresponding results added for the second design value.

The heating steam enthalpy is the energy content per kg of heating steam which is fed into a heating condenser on the primary side.

The condensate enthalpy describes the energy content per kg of expanded steam which leaves a steam turbine and is fed into a condenser.

The specific heat capacity of the medium to be heated is a material property of this medium and may be gathered from reference works for the medium to be heated (for example, water) which is used in each case.

The turbine utilization degree is determined essentially by the design of the turbine for nominal operation.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
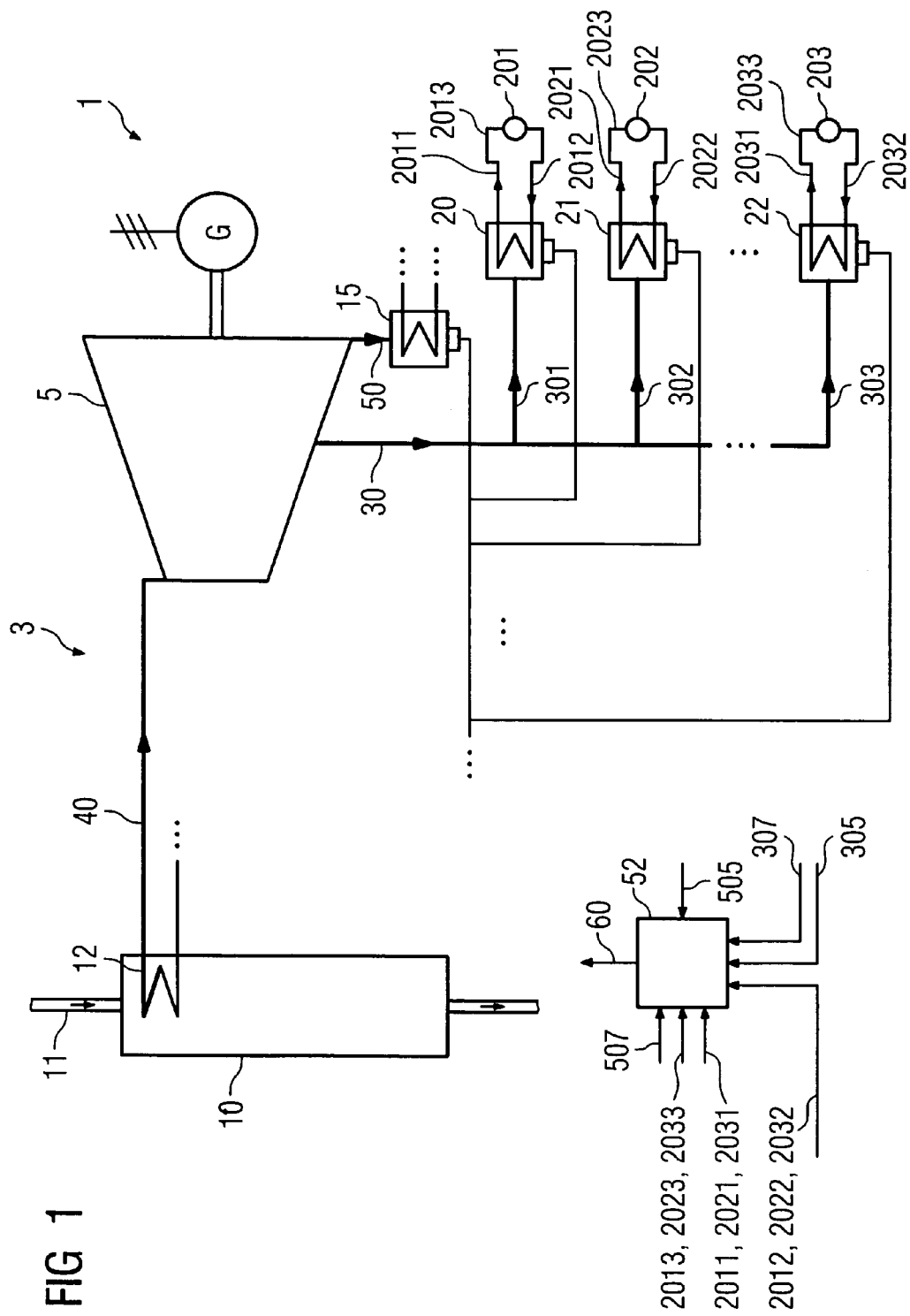
FIG. 1 shows a device according to an embodiment of the invention for regulating the power output of a combined-cycle power station.

The figure illustrates a device 1 for regulating the power output of a combined-cycle power station 3. The power station 3 in this case includes a steam generator 10 designed for example, as a waste-heat boiler which is heated by means of exhaust gas 11 from a gas turbine.

The power station 3 includes, furthermore, a steam turbine 5 which is operated by way of operating steam 40 provided as fresh steam by the steam generator 10.

The steam turbine 5 is coupled, for the generation of electrical energy, to a generator G, by which electrical energy can be fed into an energy supply network.

After work has been performed in the steam turbine 5, expanded steam 50 leaves the steam turbine 5 and is supplied to a condenser 15; the condensate which accumulates there is supplied to a feed water preparation unit of the power station 3 in a way not illustrated in any more detail.

To generate the operating steam 40 in the steam turbine 5, in the present exemplary embodiment a high-pressure evaporator 12 is provided, which is arranged in the steam generator 10 at the hot end of the latter.

Since the power station 3 is a combined-cycle power station, for the generation of distance heat heating condensers 20, 21, 22 are provided, which are heated in each case by way of a heating steam part stream 301, 302, 303. The heating steam part streams 301, 302, 303. are extracted from a stream of heating steam 30 which, in turn, is extracted from the steam turbine 5, for example downstream of a medium-pressure stage for the steam turbine 5. The heating steam part streams 301, 302, 303 may in this case also be extracted from the steam turbine 5 from different steam tapping points, each with a different energy content.

A medium to be heated flows in each case through the heating condensers 20, 21, 22 and discharges heat energy to heat consumers 201, 202, 203, for example for heating purposes.

The steam power provided by the steam generator 10 is thus converted both into electrical energy and into heat energy (distance heat).

The provision of a required steam power by the steam generator 10 is implemented by way of a regulating device of the steam generator 10. The regulating device is not illustrated in the figure. The regulating device must be supplied with at least one desired power output value, on the basis of which corresponding steam generation takes place.

As regards the present combined-cycle power station 3, the desired power output value includes a first desired value (not illustrated in the drawing), which includes an electrical power output of the power station 3, and a second desired value 60, which includes a distance heat power output of the power station 3.

The first desired value is derived from a power output requirement of the power station 3, normally an electrical load schedule being predetermined by a management center, for example for the next 24 hours.

The second desired value 60 relates to the distance heat power output (reduced electrical power output) of the power station 3, which is provided by means of the heating steam 30 or the heating steam part streams 301, 302, 303 and the heating condensers 20, 21, 22.

For predetermining the desired power output value for the regulating device of the steam generator 10, then, with regard to the second desired value 60 a computing unit 52 is provided, by which the second desired value 60 is calculated with reference to quantities determined in the region of the uncoupling of the distance heat.

For this purpose, the computing unit 52 is supplied at least with values for the mass flows 2013, 2023, 2033 of the medium to be heated, carried in each case in the secondary circuits of the heating condensers 20, 21, 22, for the forward-flow temperatures 2011, 2021, 2031 of the mass flows and for their return-flow temperatures 2012, 2022, 2032.

The mass flows and the forward-flow and return-flow temperatures may be recorded, for example, by the use of sensors and be supplied as corresponding measurement values to the computing unit 52.

The second desired value 60 is advantageously determined by the computing unit 52 using the formulae mentioned at an earlier juncture in the description, whereby the heating steam mass flow of the heating steam 30 is calculated from the mass flows of the medium to be heated and from the forward-flow and return-flow temperatures associated with these in each case.

The further quantities occurring in the formulae, heating steam enthalpy 305, condensate enthalpy 505, the specific heat capacity 307 of the medium to be heated and turbine efficiency 507, are preferably not measured, but, instead, according to the design of the power station 3, are assumed to be constant quantities which, in particular, are already known.

For example, the value for the specific heat capacity may amount to $$\frac{4.19 \text{ kJ}}{\text{kg K}}$$

(when water is used as the medium to be heated).

The turbine utilization degree 507 may amount, for example, to 85% and the condensate enthalpy to $$\frac{2300 \text{ kJ}}{\text{kg}}.$$

The values for the heating steam enthalpy 305 of the heating condensers 20, 21, 22 may, for example, be given as follows:
heating steam enthalpy 305 of the heating condenser 20:

$$\frac{3520 \text{ kJ}}{\text{kg}}$$

heating steam enthalpy 305 of the heating condenser 21:

$$\frac{2930 \text{ kJ}}{\text{kg}}$$

and
heating steam enthalpy 305 of the heating condenser 22:

$$\frac{2720 \text{ kJ}}{\text{kg}}.$$

The second desired value 60 determined by the computing unit 52 is added to the first desired value (this may likewise be carried out, for example, by means of the computing unit 52) and is supplied to the regulating device of the steam generator 10.

Figure 2:
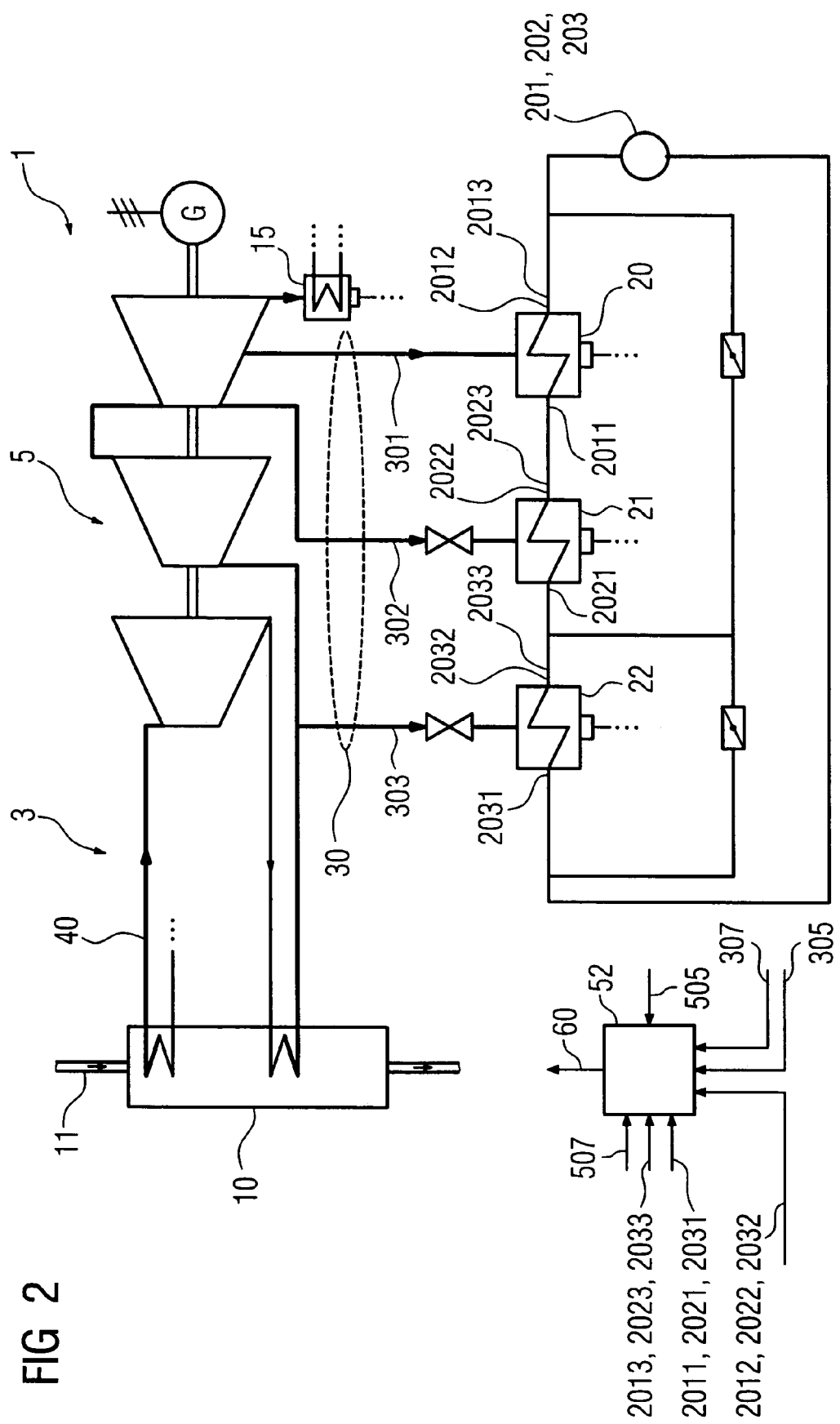
FIG. 2 shows an embodiment of the invention.

FIG. 2 shows a preferred embodiment of the invention.

The steam turbine 5 of the power station 3 in this case comprises three pressure stages, for example a high-pressure, a medium-pressure and a low-pressure stage.

Heating steam 30 for the heating of heating condensers 20, 21, 22 is in this case extracted from the steam turbine 5 at various tapping points, so that heating steam part streams 301, 302, 303 of the heating steam 30 have energy levels different from one another.

In the exemplary embodiment of FIG. 2, in this case, the heating condenser 20 is heated by use of the heating steam part stream 301 which is at a lower energy level, as compared with the other heating steam part streams 302 and 303.

The heating condensers 21 and 22 follow the heating condenser 20 in series, so that a medium to be heated flows in succession through the heating condensers 20, 21 and 22 and can be brought to a higher temperature level by way of the heating condenser which follows in each case. To set a temperature desired in each case for the medium to be heated, valves are connected into the supply lines between the steam turbine 5 and the heating condensers 21 and 22, so that the heating steam quantity which is supplied to the respective heating condensers 21 and 22 by way of the heating steam part streams 302 and 303 can be set.

In the exemplary embodiment of FIG. 2, the forward-flow temperatures 2011, 2021 and 2031 and return-flow temperatures 2012, 2022 and 2032, shown in FIG. 1, have the significance of outlet and inlet temperatures of the medium to be heated out of and into the respective heating condensers.

The values for the heating steam enthalpies 305 of the heating condensers 20, 21 and 22, the values being given by way of example in connection with FIG. 1, are advantageously implemented for the exemplary embodiment according to FIG. 2.

One or more heat consumers 201, 202, 203 can be connected into the heat circuit formed by way of the heating condensers 20, 21 and 22.

In the exemplary embodiment of FIG. 2, the heating steam part stream 303 is fed downstream of a heat exchanger surface 42.

In the cascade connection of the heating condensers 20, 21, 22, further control elements for setting desired part streams of the medium to be heated may be provided, for example control flaps or valves or else branch lines. For this purpose, in the example of FIG. 2, a control flap is provided in order to pick off a part stream of the medium to be heated at the outlet of the heating condenser 22 and to supply it via a branch line to the inlet of this heating condenser and/or to supply said part stream to the inlet of the heating condenser 20 via a further control flap.

A series of further variations may be envisaged in addition to the design of the cascade connection shown with respect to the heating condensers 20, 21 and 22.

The function and operation of the computing unit 52 of FIG. 2 corresponds to those of FIG. 1.

In summary, an embodiment of the present invention can be outlined as follows:

In a method according to an embodiment of the invention and a device according to an embodiment of the invention for regulating the power output of a combined-cycle power station, that power output fraction which is allocated to the uncoupling of distance heat is determined by adopting the mass flow or mass flows of a medium to be heated through one or more heating condensers and the forward-flow and return-flow temperatures (outlet and inlet temperatures) of the medium to be heated which occur at the same time.

The quantities can be determined in a simple way in the region of the uncoupling of the distance heat, so that, in particular, complicated measurements in the region of a steam turbine, by which the heating condensers are supplied with heating steam, are avoided.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for regulating the power output of a combined-cycle power station, comprising:
   determining at least one desired power output value, by which at least one regulating device of an energy generator of the combined-cycle power station is acted upon, from at least one first desired value including an electrical power output of the power station and from a second desired value including a distance heat power output of the power station, the power station including at least one heating condenser for the generation of distance heat, through which a medium to be heated flows from the secondary side; and
   determining a second desired power output value by evaluating a mass flow, a forward-flow temperature, and a return-flow temperature of the medium to be heated, with respect to the heating condenser.

2. The method as claimed in claim 1, wherein the at least one heating condenser is heated on the primary side by heating steam, extracted from a steam turbine of the power station, and wherein the power station includes at least one condenser, into which expanded steam leaving the steam turbine is fed.

3. The method as claimed in claim 2, wherein at least one of a heating steam enthalpy, a specific heat capacity of the medium to be heated, a condensate enthalpy and a turbine efficiency are adopted in order to determine the second desired value.

4. A device for regulating the power output of a combined-cycle power station, wherein at least one desired power output value, by which at least one regulating device of an of the combined-cycle power station is acted upon, is determinable from at least one first desired value including an electrical power output of the power station, and from a second desired value including a distance heat power output of the power station, and wherein the power station includes at least one heating condenser for the generation of distance heat, through which a medium to be heated is capable of flowing on the secondary side, comprising:
   a computing unit, adapted to determine the second desired value upon being supplied with at least the following quantities of the medium to be heated, with respect to the heating condenser,
   a mass flow,
   a forward-flow temperature, and
   a return-flow temperature.

5. The device as claimed in claim 4, wherein the power station includes at least one steam turbine and one condenser connected to the steam turbine, and wherein the heating condenser is steam-heatable and is connected to the steam turbine on the primary side.

6. The device as claimed in claim 5, wherein the computing unit is adapted to determine the second desired value upon being supplied with at least one of the following quantities:
   a heating steam enthalpy,
   a specific heat capacity of the medium to be heated,
   a condensate enthalpy and
   a turbine utilization degree.

7. The method as claimed in claim 1, wherein the energy generator is a steam generator.

8. The device as claimed in claim 4, wherein the energy generator is a steam generator.

9. The method of claim 1, further comprising:
   regulating the power output of a combined-cycle power station based upon the determined desired power output values.

10. A method concerning regulation of power output of a combined-cycle power station, comprising:
    determining at least one desired power output value, by which at least one device of the combined-cycle power station is acted upon, from at least one of an electrical and a distance heat power output of the power station; and
    determining a second desired power output value from a mass flow, a forward-flow temperature and return-flow temperature of a medium to be heated flowing through at least one heating condenser for the generation of distance heat.

11. The method of claim 10, further comprising:
    regulating the power output of a combined-cycle power station based upon the determined desired power output values.

12. The method as claimed in claim 10, wherein the at least one heating condenser is heated on a primary side by heating steam, extracted from a steam turbine of the power station, and wherein the power station includes at least one other condenser, into which expanded steam leaving the steam turbine is fed.

13. The method as claimed in claim 12, wherein at least one of a heating steam enthalpy, a specific heat capacity of the medium to be heated, a condensate enthalpy and a turbine efficiency are adopted in order to determine the second desired value.

14. A device regarding regulation of power output of a combined-cycle power station, comprising:
    means for determining at least one desired power output value, by which at least one device of the combined-cycle power station is acted upon, from at least one of an electrical and a distance heat power output of the power station; and
    means for determining a second desired power output value from a mass flow, a forward-flow temperature and return-flow temperature of a medium to be heated flowing through at least one heating condenser for the generation of distance heat.

15. The device of claim 14, further comprising:
    means for regulating the power output of a combined-cycle power station based upon the determined desired power output values.

16. The device as claimed in claim 14, wherein the power station includes at least one steam turbine and one other condenser connected to the steam turbine, and wherein the at least one heating condenser is steam-heatable and is connected to the steam turbine on the primary side.

17. The device as claimed in claim 16, wherein the means for determining a second desired power output value is for determining the second desired value upon being supplied with at least one of the following quantities:
    a heating steam enthalpy,
    a specific heat capacity of the medium to be heated,
    a condensate enthalpy and
    a turbine utilization degree.

* * * * *